United States Patent
Quackenbush et al.

(10) Patent No.: US 6,493,457 B1
(45) Date of Patent: Dec. 10, 2002

(54) ELECTRONIC WATERMARKING IN THE COMPRESSED DOMAIN UTILIZING PERCEPTUAL CODING

(75) Inventors: Schuyler Reynier Quackenbush, Westfield, NJ (US); Amy Ruth Reibman, Matawan, NJ (US); David Hilton Shur, Aberdeen, NJ (US); James H. Snyder, North Plainfield, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/192,359

(22) Filed: Nov. 16, 1998

Related U.S. Application Data

(60) Provisional application No. 60/067,225, filed on Dec. 3, 1997.

(51) Int. Cl.[7] .................................... G06K 9/00
(52) U.S. Cl. ................ 382/100; 382/232; 382/251; 380/252; 380/287; 713/176
(58) Field of Search ................... 382/100, 232, 382/239, 251; 380/210, 252, 287, 54; 713/176; 704/200.1, 273; 381/73.1; 348/460, 463

(56) References Cited

U.S. PATENT DOCUMENTS

| 4,939,515 A | 7/1990 | Adelson |
| 5,530,759 A | 6/1996 | Braudaway et al. |

(List continued on next page.)

FOREIGN PATENT DOCUMENTS

| EP | 0 663 773 A2 | 7/1995 |
| EP | 0 663 773 A3 | 7/1995 |
| EP | 0 705 025 | 4/1996 |
| EP | 0 851 679 | 7/1998 |

OTHER PUBLICATIONS

Bin Zhu and Ahmed Tewfik; Media Compression via Data Hiding; Signals, Systems, & Computers; 1997; Conference Recor Thirty–First Asilomar Conference on pp. 647–651; vol. 1; Nov. 2–5, 1997.*

(List continued on next page.)

Primary Examiner—Joseph Mancuso
Assistant Examiner—Anand Bhatnagar
(74) Attorney, Agent, or Firm—Banner & Witcoff, Ltd.

(57) ABSTRACT

A method and apparatus are described for inserting a watermark in the compressed domain. The watermark inserted does not require a reference. An overall watermarking system incorporating the invention combines cleartext, bitstream, and integrated watermarking. In a perceptual coder, the data enters a filterbank, where it is processed into multiple separate coefficients. A rate/distortion control module uses noise threshold information from a perceptual coder, together with bit-count information from a noiseless coder, to compute scale factors. The coefficients are multiplied by the scale factors and quantized, then noiseless coded and then output for further processing/transmission. The invention supports three embodiments for inserting a mark into the bitstream imperceptibly. It is assumed that some set of scale factor bands have been selected, into which mark data will be inserted. In one embodiment, a set of multipliers $\{x_i=2^{N_i}: i \in M\}$ is chosen. Each triple is modified by dividing the scale factor by $x_i$, multiplying the quantized coefficients by $\{x_i\}$, and adding mark data to the non-zero modified quantized coefficients. In an alternate embodiment, watermark data is represented via two characteristics of the bitstream data. A Huffinan table is selected for encoding the Scale Factor Band receiving watermark data which is not the table that would normally be used. The watermark data bit is set according to any desired scheme, and the quantized coefficients are derived using the alternate Huffinan table. In another embodiment, watermarking is integrated with quantization. The watermark is therefore difficult to remove without perceptible effects. The fact that marking data is present is again indicated by characteristics of the bitstream data. The modification factors $\{x_i\}$ are now all close to unity.

42 Claims, 5 Drawing Sheets

U.S. PATENT DOCUMENTS

| | | | | | |
|---|---|---|---|---|---|
| 5,778,102 | A | * | 7/1998 | Sandford et al. | 382/239 |
| 5,930,369 | A | * | 7/1999 | Cox et al. | 283/113 |
| 6,061,793 | A | * | 5/2000 | Tewfik et al. | 713/176 |
| 6,209,094 | B1 | * | 3/2001 | Levine et al. | 399/366 |
| 6,282,299 | B1 | * | 8/2001 | Tewfik et al. | 382/100 |
| 6,285,774 | B1 | * | 9/2001 | Schumann et al. | 380/202 |
| 6,285,775 | B1 | * | 9/2001 | Wu et al. | 382/100 |
| 6,298,142 | B1 | * | 10/2001 | Nakano et al. | 382/100 |
| 6,310,962 | B1 | * | 10/2001 | Chung et al. | 380/202 |

OTHER PUBLICATIONS

Cox and Ingemar; Digital watermarking; Copyright 1996; IEEE press, pp. 487–490.*

Jian Zhao, "Applying Digital Watermarking Techniques To Online Multimedia Commerce", Proc. Of The International Conference on Imaging Science, and Applications (CISSA 97), Jun. 30–Jul. 3, 1997, 7 pages.

E. Koch et al., "Towards Robust And Hidden Image Copyright Labeling", Proc. Of 1995 IEEE Workshop on Nonlinear Signal and Image Processing, Jun. 20–22, 1995, pp. 1–4.

Jian Zhao, "A WWW Service To Embed And Prove Digital Copyright Watermarks", Proc. Of the European Conference On Multimedia Applications, Services and Techniques, May 1996, 15 pages.

Jian Zhao, "Look, It's Not There", Byte Magazine, Jan. 1997, 4 pages.

* cited by examiner

FIG. 6

| | INCREASE IN BITS (PER MARKED FRAME) | INCREASE IN RATE |
|---|---|---|
| SYNCHRONIZATION | 5.2 | 0.25% |
| SYNC + 32 BITS | 9.0 | 0.44% |

FIG. 7

| | INCREASE IN BITS (PER MARKED FRAME) | INCREASE IN RATE |
|---|---|---|
| SYNCHRONIZATION | 124 | 0.005% |
| SYNC + 100 BITS | 138 | 0.006% |
| SYNC + 600 BITS | 557 | 0.024% |

ELECTRONIC WATERMARKING IN THE COMPRESSED DOMAIN UTILIZING PERCEPTUAL CODING

RELATED APPLICATIONS

This application claims priority under Title 35, United States Code Sections 199(e) from U.S. Provisional Application Serial No. 60/067,225, filed Dec. 3, 1997.

FIELD OF THE INVENTION

The present invention relates to electronic watermarking of datastreams and, in particular, to an imperceptible watermark which is inserted in the compressed domain and can be detected without a reference.

BACKGROUND OF THE INVENTION

Electronic distribution of multimedia content is an important byproduct of the confluence of recent technological advances. Increasing network bandwidth, compression algorithms that preserve audio and video quality while reducing bit rate dramatically, higher density storage devices, and network search engines, when taken together, support network services which are revolutionizing the distribution of music and video.

Content owners naturally wish to maintain control over the distribution of their wares. To effectively protect their intellectual property (IP), an integrated system design is necessary [J. Lacy, D. P. Maher, and J. H. Snyder, "Music on the Internet and the Intellectual Property Protection Problem", *Proc. International Symposium on Industrial Electronic*, Guimaraes, Portugal, July 1997]. A typical protection system consists of three major building blocks. First, compressed content is stored in a cryptographic container before distribution to users. Second, a flexible licensing mechanism is utilized to answer questions about the trustworthiness of those seeking access to the content. Third, watermarks are embedded in the content in an imperceptible fashion in order that the content can be identified if the cryptographic container has been breached. A secure system design integrates these three components.

An electronic watermark is a data stream inserted into multimedia content. It contains information relevant to the ownership or authorized use of the content. Watermarks typically serve one of three functions: identification of the origin of the content, tracing of illegally distributed copies of the content, and disabling of unauthorized access to the content. No single marking method is best suited to all three functions, both because of complexity and because different functions and marking algorithms are resistant to different kinds of attacks. Any single piece of music or video can therefore be expected to be marked with a variety of different methods.

For copyright identification, every copy of the content can be marked identically, so the watermark needs to be inserted only once prior to distribution. Ideally, detection should not require a reference, because a search engine has no apriori way to identify the work from which it must recover the mark. The watermark particularly needs to be detectable inside an edited work in which the original content may be either shortened or abutted with other works. Not only must the watermark be short enough to be detected in a shortened version of the work, but some means must be provided to synchronize the detection process in order that the watermark can be located in the processed bitstream. Finally, a watermark used for copyright identification must be robust to further processing. Any attempt to remove it, including re-encoding the content, should lead to perceptible distortion.

Transaction identification requires a distinct mark for each transaction. The primary challenge of point-of-sale marking is to move the content through the watermarking engine quickly, meaning that the algorithm used must be of low complexity. One strategy that meets this requirement is to inert the watermark in the compressed domain. Ideally, mark insertion should increase the data rate very little. In contrast to copyright ownership marking, the transaction identification watermark must be robust to collusion attacks.

Disabling access to content is generally best performed by mechanisms other than watermarks. If a watermark is used to disable access to content, the watermark recovery mechanism should be of low complexity. It should not be used as a protection of last resort, however, as disabling access clearly indicates the location of the watermark to anyone who can reverse-engineer the access mechanism.

Watermarks used in conjunction with compression algorithms fall into one of three classes: cleartext (PCM) marking, bitstream marking, and marking integrated with the compression algorithm. Each type has advantages and disadvantages. The intended use of the watermark directly affects the choice of algorithm.

Cleartext marking relies on perceptual methods to imperceptibly embed a data stream in a signal. The model for many cleartext marking algorithms is one in which a signal is injected into a noisy communication channel, where the audio/video signal is the interfering noise [J. Smith, B. Comisky, "Modulation and Information Hiding in Images", *Proc. First International Information Hiding Workshop*, LNCS 1174, Springer-Verlag, Cambridge, U.K., May/June 1996, pp. 207–226]. Because the channel is so noisy and the mark signal must be imperceptible, the maximum bit rates that are achievable for audio are generally less than 100 bps.

A cleartext mark appears in all processed generations of the work, since by design the marking algorithm is both secure and robust in the face of typical processing. It is therefore well suited to identification of the work. There are two major disadvantages to cleartext marking. First, because such algorithms compute a perceptual model, they tend to be too complex for point-of-sale applications. Second, a potentially significant problem, is that these algorithms are susceptible to advances in the perceptual models used in compression algorithms. Many cleartext marking algorithms have been reported [see, e.g. *Proceedings of the Fourth International Conference on Image Processing*, Santa Barbara Calif., October 1997].

Retrieval mechanisms for cleartext watermarks fall into two classes: reference necessary and reference unnecessary. In either case, the mechanism for mark recovery is generally of high complexity. Furthermore, if means for detecting these watermarks are embedded in a player, an attacker, by reverse engineering the player, may be able to identify and remove the marks. Cleartext watermarks typically should not be used to gate access to content.

Bitstream marking algorithms manipulate the compressed digital bitstream without changing the semantics of the audio or video stream. For example, a data envelope in an MPEG-2 Advanced Audio Coding (AAC) [IS 13818-7 (MPEG-2 Advanced Audio Coding, AAC), M.Bosi, K. Brandenburg, S. Quackenbush, M. Dietz, J. Johnston, J. Herre, H. Fuchs, Y. Oikawa, K. Akagiri, M. Coleman, M. Iwadare, C. Lueck, U. Gbur, B. Teichmann] audio frame could contain a watermark, albeit one which could easily be removed. Bitstream marking is low-complexity, so it can be used to carry transaction information. However these marks cannot survive D/A conversion and are generally not very robust against attack; for example, they are susceptible to collusion attacks. Because the mark signal is unrelated to the media signal, the bit rate that these techniques can support can be as high as the channel rate. This type of mark can be easily extracted by clients and is thus appropriate for gating access to content.

Integrating the marking algorithm with the compression algorithm avoids an 'arms race' between marking and compression. Since the perceptual model is available from the workings of the compression algorithm, integrated marking algorithms alter the semantics of the audio or video bitstream, thereby providing resistance to collusion attacks. Depending on the details of the marking algorithm, the mark may survive D/A conversion. An example of this approach is described by F. Hartung and B. Girod in "Digital Watermarking of MPEG-2 Coded Video inthe Bitstream Domain", Proc. IEEE ICASSP, pp. 2621–4, April 1997. The method of Hartung and Girod does not use perceptual techniques.

A watermark which can be recovered without a priori knowledge of the identity of the content could be used by web search mechanisms to flag unauthorized distribution of the content. Since media are compressed on these sites, a mark detection algorithm that operates in the compressed domain is useful. Accordingly, it is a primary object of the present invention to provide a robust integrated watermark that is inserted into audio or video data in the compressed domain utilizing perceptual techniques.

SUMMARY OF THE INVENTION

This invention integrates watermarking with perceptual coding mechanisms. A first generation technique is described which inserts data, typically a watermark, into an audio or video bitstream cooperatively with the compression algorithm. The data may be recovered with a simple decoding process. It is robust to attacks which modify bitstream scale factors, in the sense that damaging the mark produces perceptible artifacts. The watermarking technique of the present invention can be detected in the compressed domain without a reference, thereby avoiding a complete decode. An overall watermarking system incorporating the invention combines source (cleartext), bitstream (non-semantic altering), and integrated (semantic altering) watermarking.

In a generic perceptual coder according to the invention, the audio or video data enters the filterbank, where it is processed into multiple separate coefficients. The perceptual model module computes noise threshold information for the coefficients. The rate/distortion control module uses this information, together with bit-count information received from a noiseless coding module, to compute the scale factors to be used. For audio data, the scale factors module multiplies the coefficients received from the filterbank by the scale factors received from rate/distortion control and sends the resulting quantities to the Quantizer. For video data, the scale factors are used by the Quantizer to quantize the coefficients. For both audio and video data, the quantized coefficients from Quantizer are noiseless coded and then sent to the bitstream multiplexor. The coded data is then output from the bitstream multiplexor for further processing and transmission. The integrated marking technique of the present invention is particularly implemented by the perceptual modeling, rate/distortion control, quantization, and noiseless coding modules.

In the methods of the present invention, $A=\{f_i, H_i, \{q_{ij}\}\}$ is the set of triples of scale factors $f_i$, Huffman tables $H_i$, and quantized coefficients $\{q_{ij}\}$. The present invention supports three different embodiments for inserting a mark into the bitstream imperceptibly. It is assumed in these embodiments that some set of scale factor bands have been selected, into which mark data will be inserted. The specific method by which SFB are chosen for marking is not specified; however the marking set will be dynamic. M is the set of indices associated with the set of SFB chosen for marking.

In one embodiment, a set of multipliers $\{x_i=2^{N_i}: i \in M\}$ is chosen. Each triple $\{f_i, H_i, \{q_{ij}\}: i \in M\}$ is modified by dividing the scale factor by $x_i$, multiplying the quantized value $\{q_{ij}\}$ by $\{x_i\}$, and adding mark data $\{m_{ij}\}$ to the non-zero modified quantized values. The Huffman table for the modified SFB is now the smallest codebook that accommodates the largest value $q_{ij} \times x_i + m_{ij}$. Finally, the integrally watermarked encoded source is output from the perceptual coder. Since the original scale factors were chosen perceptually, the resulting mark is imperceptible.

In an alternate embodiment, applicable only to audio, the watermark data is represented via two particular characteristics of the bitstream data. The indication that watermark data is present is that the Huffman table used to encode the SFB is not the table that would ordinarily be used. The watermark data bit is set according to any desired scheme, and the quantized coefficients are derived using the alternate Huffman table. Finally, the integrally watermarked encoded source is output from the perceptual coder.

Another embodiment is a method for watermarking which is integrated with quantization. The watermark is therefore difficult to remove without perceptible effects. The fact that marking data is present is again indicated by characteristics of the bitstream data. The watermark bit(s) are set before quantization. The modification factors $\{x_i\}$ are all now close to unity. The resulting Huffman table for an SFB therefore will be the original Huffman table or the next larger codebook. Because the modification to the spectral coefficients occurs before quantization, the changes to the reconstructed coefficients will be below the perceptual threshold.

BRIEF DESCRIPTION OF THE DRAWINGS

FIG. 6 is a table displaying the results of an audio simulation utilizing the embodiment of FIG. 5; and FIG. 7 is a table displaying the results of a video simulation utilizing the embodiment of FIG. 5.

DETAILED DESCRIPTION

Figure 1:
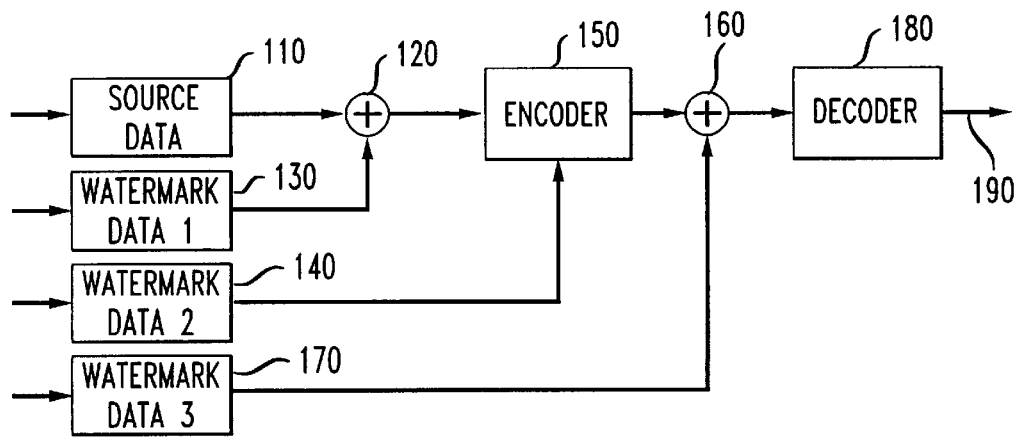
FIG. 1 is an overview block diagram of an embodiment of a watermarking system incorporating one embodiment of the present invention.

The watermarking technique of the present invention can be detected in the compressed domain without a reference, thereby avoiding a complete decode. As shown in FIG. 1, an overall watermarking system incorporating the invention is a first generation system that combines source, bitstream, and integrated watermarking. In the system of FIG. 1, the source (cleartext) data 110 is optionally injected 120 with a source watermark 130. Typically, this cleartext (source) watermarking is PCM (Pulse Code Modulation) marking, but any of the many other forms of cleartext marking known in the art would be suitable.

The source data with its (optional) newly added cleartext watermark is then passed to the perceptual coder (encoder) 150, where the data is further marked with a second watermark 140 via a process that is integral to the compression process. The invention specifically comprises these integrated watermarking components 140 and 150 of FIG. 1, embodiments of which are described in detail in conjunction with FIGS. 3–5. The integrated watermarking and coding process of the invention is a semantic altering process.

After the compression and marking process 150, the compressed data is optionally combined 160 with a third watermark 170 via a bitstream marking process. Typically, this involves one or more XOR operations, but any bitstream marking technique known in the art would be suitable. The bitstream watermarking process is non-semantic altering. After (optional) bitstream watermarking, the compressed and watermarked data is transmitted or otherwise provided to the output device, where it is decoded 160 and provided to the user.

The integrated watermarking system of the invention can be configured to support the three primary marking functions. As depicted in FIG. 1, it does not include, but is compatible with, use of front-end cleartext marking algorithm. It is assumed that the cleartext original is not available to any parties, except possibly auditors seeking to recover the watermark. In particular, the cleartext original is not available to attackers. The decompressed and marked content will generally be available to everyone.

In MPEG Advanced Audio Coding (AAC), spectral lines are grouped into 49 "scale factor bands" (SFB), each band containing between 4 and 32 lines. Associated with each band is a single scale factor, which sets the quantizer step-size, and a single Huffman table (AAC employs 11 non-trivial Huffman tables). The coefficient for each spectral line is represented by an integer (quantized) value. In MPEG video, a block consists of 64 coefficients, and each set (termed a macroblock) of 6 blocks has an associated quantization step-size $Q_p$. The same Huffman table is used for the coefficients for all $Q_p$ values. As with audio, each coefficient is represented by an integer after quantization. Because the watermarking algorithms for audio and video are essentially identical, for consistency audio terminology (scale factor) is used herein when techniques are discussed. When the results for video are discussed in connection with FIGS. 6 and 7, terminology specific to video is used.

Figure 2:
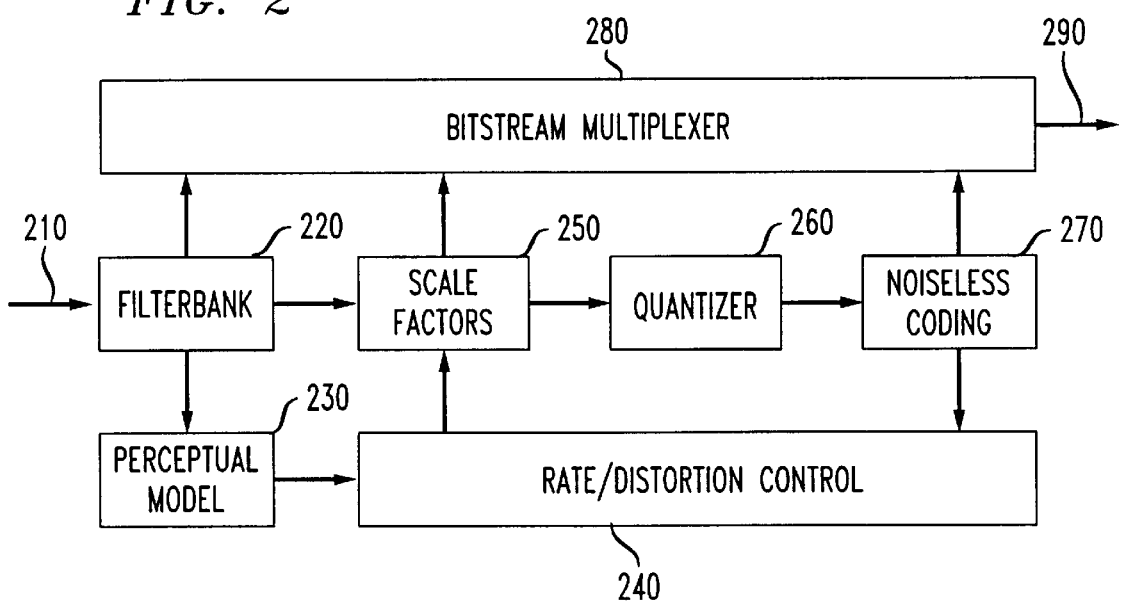
FIG. 2 is a simplified block diagram of an embodiment of a generic perceptual coder according to the present invention.

FIG. 2 is a simplified block diagram of an embodiment of a generic perceptual coder according to the present invention. As seen in FIG. 2, the audio or video data 210 enters the filterbank 220, where it is processed into multiple separate coefficients. Information about what type of filterbank 220 was used is sent to the bitstream multiplexor 280. The coefficients themselves are passed to the scale factor module 250 and to the perceptual model module 230. The perceptual model module 230 computes noise threshold information for the coefficients and passes this information to the rate/distortion control module 240. The rate/distortion control module 240 uses this information, together with bit-count information received from a noiseless coding module 270, to compute the scale factors to be used, which are then passed to the scale factor module 250.

For audio data, the scale factors module 250 multiplies the coefficients received from the filterbank 220 by the scale factors received from rate/distortion control 240 and sends the resulting quantities to the Quantizer 260. For video data, the scale factors are used by the Quantizer 260 to quantize the coefficients. For both audio and video data, the quantized coefficients from Quantizer 260 are noiseless coded 270 and then sent to the bitstream multiplexor 280. The coded data is then output 290 from the bitstream multiplexor 280 for further processing and transmission. The integrated marking technique of the present invention is particularly implemented by the perceptual modeling 230, rate/distortion control 240, quantization 260, and noiseless coding 270 modules of FIG. 2.

In the description of the methods of the present invention, $A=\{f_i, H_i, \{q_{ij}\}\}$ is the set of triples of scale factors $f_i$, Huffman tables $H_i$, and quantized coefficients $\{q_{ij}\}$. Note that only one Huffman table is used in video. The present invention supports three different embodiments for inserting a mark into the bitstream imperceptibly. It is assumed in these embodiments that some set of scale factor bands have been selected, into which mark data will be inserted. The specific method by which SFB are chosen for marking is not specified; however, for audio, SFB encoded with the null Huffman table $H_0$ should probably not be marked. For video, zero coefficients should remain zero and not be modified. Hence, the marking set will be dynamic. M is the set of indices associated with the set of SFB chosen for marking.

Figure 3:
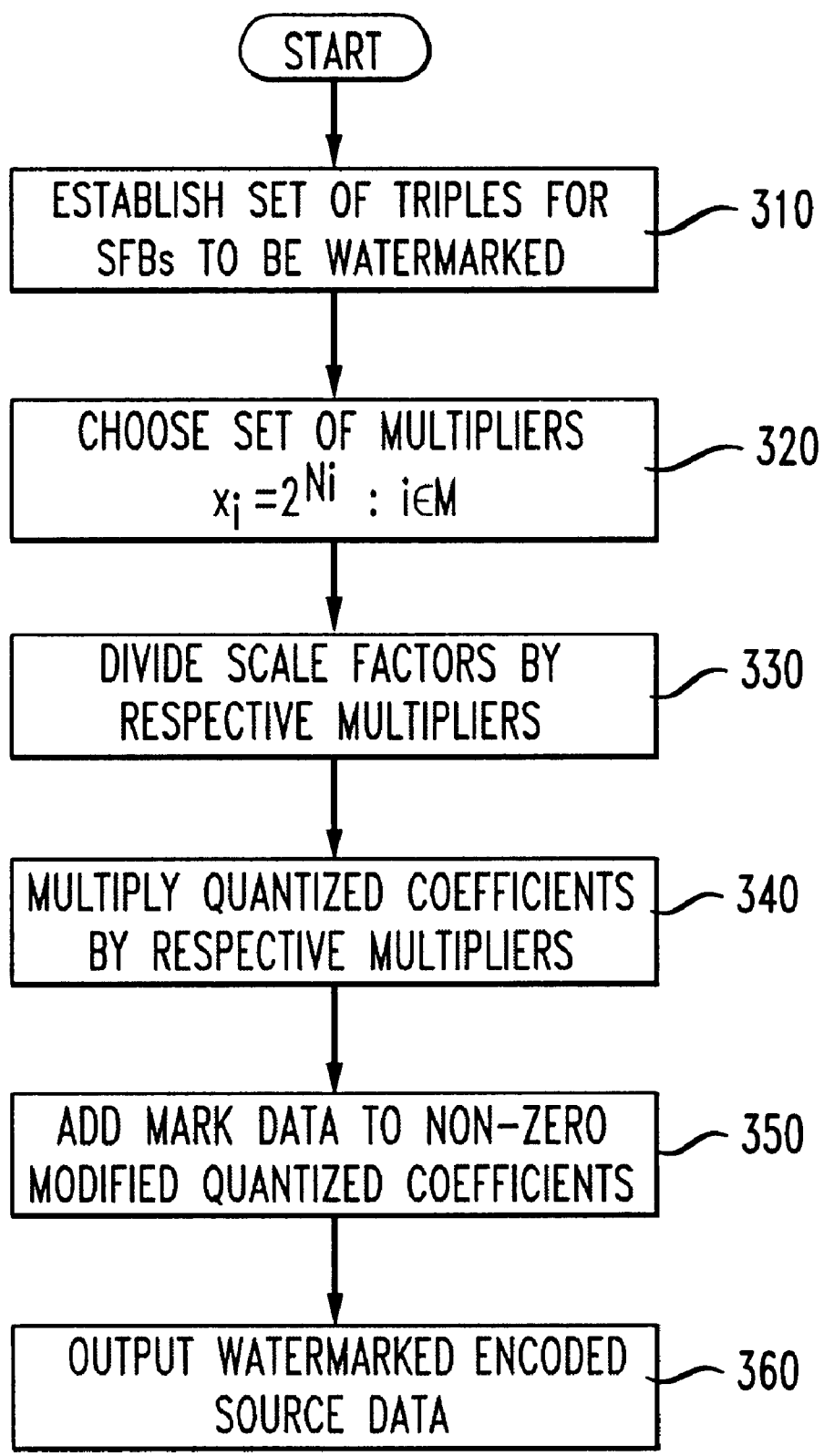
FIG. 3 illustrates an embodiment of the method of perceptual coding according to the present invention.

One embodiment of the method for electronic watermarking in the compressed domain utilizing perceptual coding is illustrated by the flow diagram in FIG. 3. As illustrated in FIG. 3, first a set of triples is established 310 for each SFB that is to receive watermark data. Next, a set of multipliers $\{x_i=2^{N_i}: i\in M\}$ is chosen 320. Each triple $\{f_i, H_i, \{q_{ij}\}: i\in M\}$ is modified by dividing 330 the scale factor by $x_i$, multiplying 340 the quantized value $\{q_{ij}\}$ by $\{x_i\}$, and adding 350 mark data $\{m_{ij}\}$ to the non-zero modified quantized values. Finally, the integrally watermarked encoded source is output 360 from the perceptual coder 150 of FIG. 1. Mathematically, the result of this perceptual coding step can be represented: A→A', where $$\forall i: i\in M, \{f_i', H_i', \{q_{ij}'\}\}=\{f_i, H_i, \{q_{ij}\}\},$$

$$\forall i: i\in M, \{f_i', H_i', \{q_{ij}'\}\}=\{f_i/x_i, H_i'', \{q_{ij}\times x_i+m_{ij}\}\},$$

where $H_i''$ is the smallest codebook that accommodates the largest value $q_{ij}\times x_i+m_{ij}$.

Since the original scale factors were chosen perceptually, the resulting mark is imperceptible. A feedback mechanism similar to the one described by Hartung and Girod can be used to prevent modification of scale factors that would increase the bit rate significantly. It should be noted that if the attacker can identify the frame and SFB containing the mark data, then that data can easily be removed. A possible attack on this method would be to run a perceptual model on the decompressed output. While it is unlikely that the perceptual model could indicate unambiguously every marked location, it seems likely that many could be identified.

Figure 4:
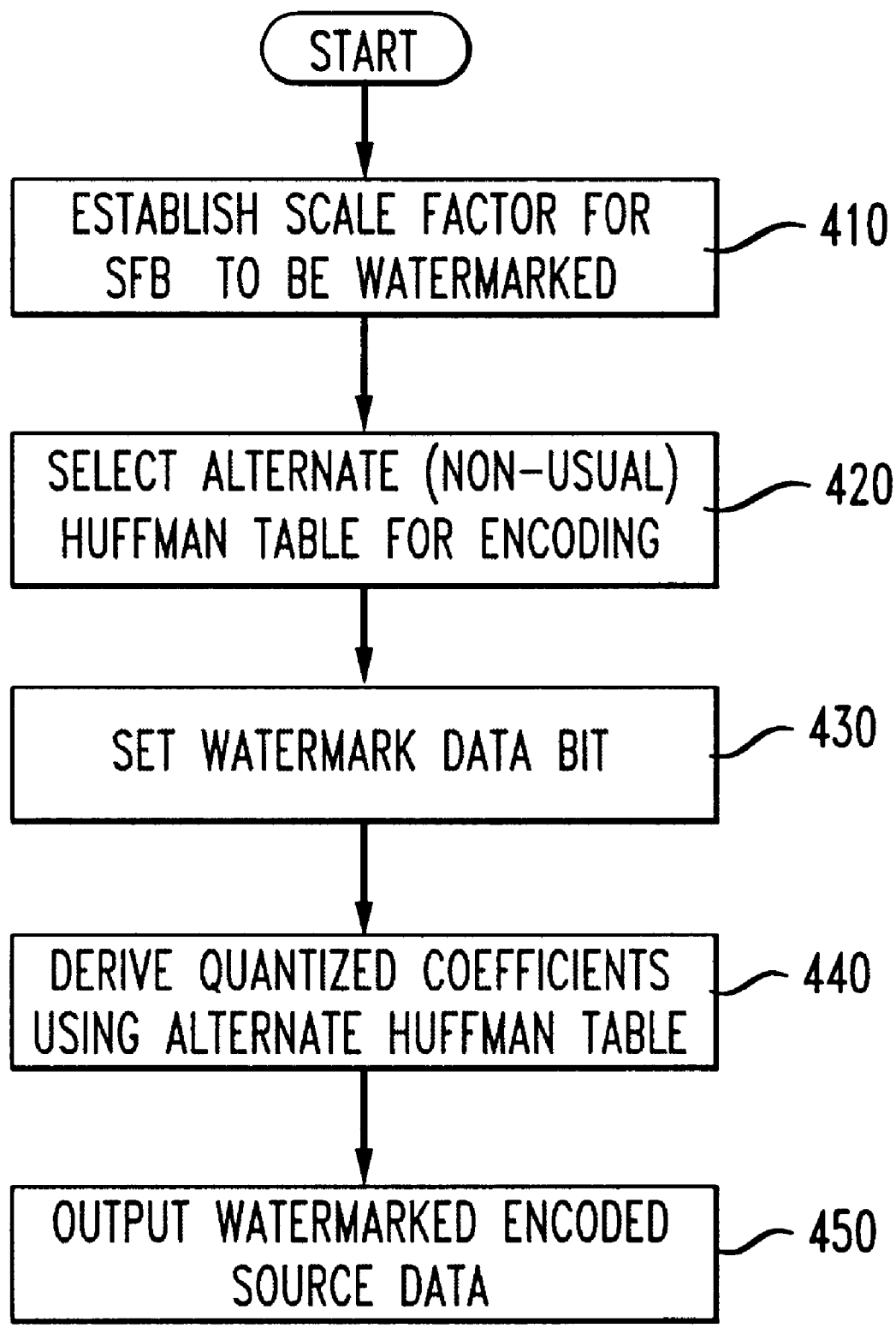
FIG. 4 illustrates an alternate embodiment of the method of perceptual coding according to the present invention.

An alternate embodiment, applicable only to audio data, is illustrated by the flow diagram in FIG. 4. In this embodiment, the watermark data is represented via two particular characteristics of the bitstream data. The indication that watermark data is present is that the Huffman table used to encode the SFB is not the table that would ordinarily be used. The value of the watermark data bit (one bit per SFB) can be indicated in many ways; for example, if the SFB index is even, the value is 0, otherwise 1. Mathematically, this is represented: $\{f_i, H_i, \{q_{ij}\}\}\rightarrow\{f_i, H_i',$ {$q_{ij}$}}. As illustrated in FIG. 4, the scale factor is established 410 for the SFB to receive watermark data. A Huffman table is then selected 420 for encoding SFB that can still encode all the coefficients with the required dynamic range. The watermark data bit is set 430 according to any desired scheme, and the quantized coefficients are derived 440 using the alternate (non-usual) Huffman table. Finally, the integrally watermarked encoded source is output 450 from the perceptual coder 150 of FIG. 1.

It should be noted that, in this method, sectioning, a process by which codebooks are "promoted" to reduce bit rate, introduces similar changes in the choice of codebooks. That is, sectioning itself can erase the mark data indication. Also, this marking is particularly easy to identify, since an attacker looking at the bitstream can observe that the codebook used to encode the coefficients in the SFB is not the minimum codebook required. However, by a sensible choice of SFB, it is possible to insert mark data in a way that will not be modified by sectioning but rather mimics the action of sectioning and therefore is somewhat less obvious to an attacker.

The methods of FIGS. 3 and 4 are coupled to the encoder 150 of FIG. 1 only via the overall bit rate limit.

Figure 5:
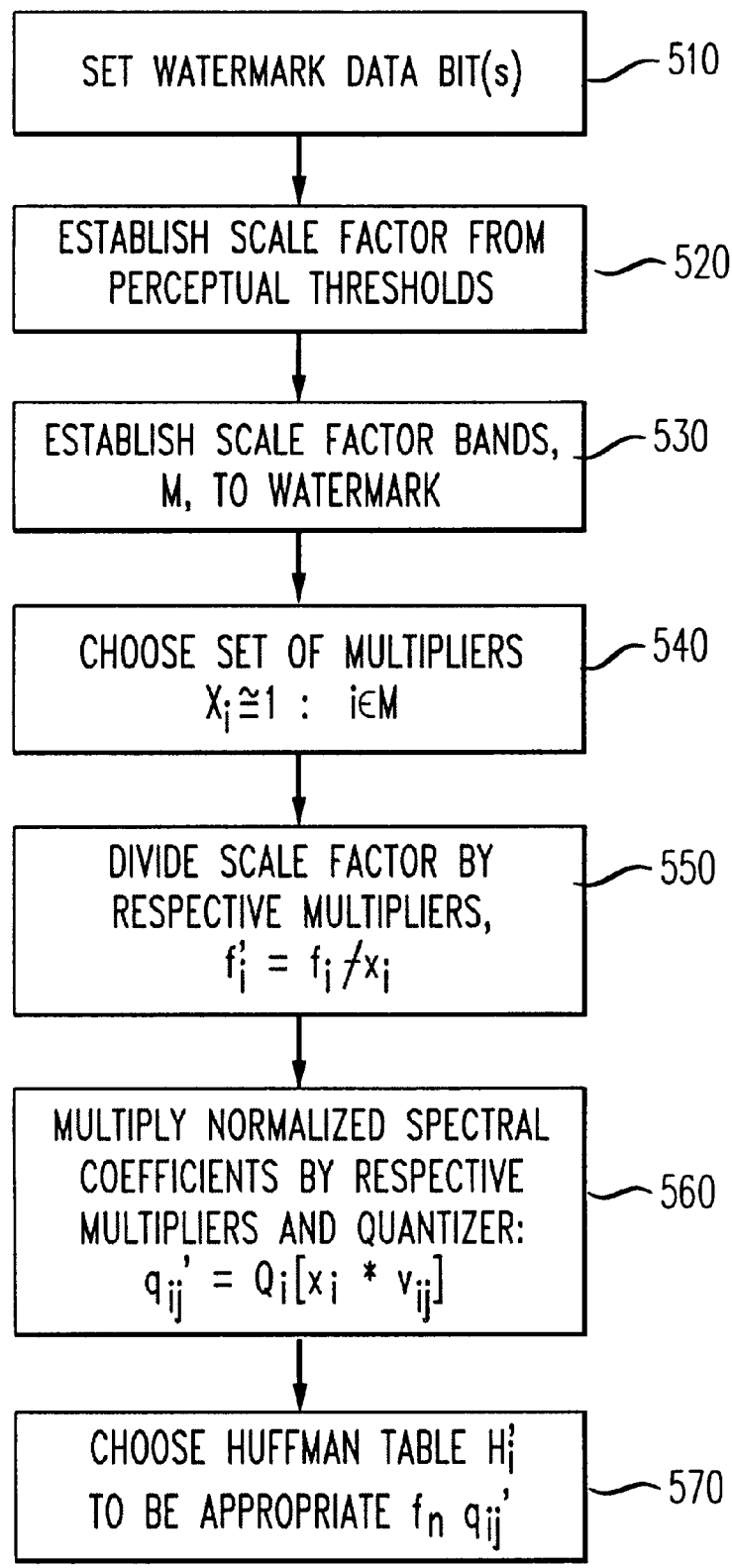
FIG. 5 illustrates another embodiment of the method of perceptual coding according to the present invention.

Another embodiment of the invention, illustrated by the flow diagram in FIG. 5, is a method for watermarking which is fully integrated with quantization. The watermark is therefore difficult to remove without perceptible effects. As in the embodiment of FIG. 4, the fact that marking data is present is indicated by characteristics of the bitstream data. The watermark data bit(s) are set before a quantization step. As in the embodiment of FIG. 3, the scale factor $f_i$ and the normalized spectral coefficients {$q_{ij}$} are modified by a factor $x_i$, but now all {$x_i$} are close to unity. The normalized spectral coefficients {$q_{ij}$} referred to in audio will also be referred to herein as simply "coefficients." If {$v_{ij}$} is the set of spectral coefficients prior to quantization, and $Q_i$ is the quantizer for SFB i, i.e. $\forall i${$q_{ij}$}=$Q_i$[{$v_{ij}$}], then mathematically:

$$\{f_i, H_i, \{q_{ij}\}\} \rightarrow \{f_i', H_i', \{q_{ij}'\}\},$$

where $f_i' = f_i / x_i$ $q_{ij}' = Q_i[x_i \times v_{ij}]$ $H_i' = H_i$ or the next larger codebook appropriate for $q_{ij}'$; and $x_i \cong 1$ Because the modification to the spectral coefficients occurs before quantization, the changes to the reconstructed coefficients will be below the perceptual threshold. If this change were introduced after quantization, the change in some quantized values would be greater than the perceptual noise floor. Equivalently, an attacker who modifies the quantized values to eradicate or modify the mark will be introducing energy changes that exceed the noise floor. Because the changes in step-sizes will be small, because not all coefficients will change, and because the attacker will not have access to the uncompressed cleartext source material, the attacker will generally not be able to identify those SFB which are used for marking. Further, the change in bit rate associated with marking should be small. In this third embodiment method, the value of the watermark bit can be indicated in a variety of ways, e.g. it might take on the value of the Least Significant Bit (LSB) of the scale factor value, in which case a scale factor needs to be modified only if its LSB differs from the desired value. For both audio and video, the increase in bit count incurred by this method must be monitored.

As illustrated in the flow diagram in FIG. 5, the watermark data bit(s) are set according to any desired scheme in step 510. Then, the scale factors are established from perceptual thresholds at step 520. With the watermark bit(s) set and the scale factors established, the next step is to establish a plurality of scale factor bands, M, in which to locate the set watermark bit(s) at step 530. With the bands established, the next step is to choose an appropriate set of multipliers {$x_i \cong 1$: $i \in M$} at step 540. Then, at step 550, each triple {$f_i, H_i, \{q_{ij}\}$}: $i \in M$} is modified by dividing the scale factor by $x_i$. This results in modified set $f_i'$. The normalized spectral coefficients then are multiplied at step 560 by respective multipliers and quantized resulting in $q_{ij}' = Q_i[x_i \times v_{ij}]$. Now, in step 570, a Huffman Table $H_i'$ is chosen to be appropriate for $q_{ij}'$. This may be $H_i$ or the next larger codebook appropriate for $q_{ij}'$. Finally, the integrally watermarked encoded source is output from the perceptual coder 150 of FIG. 1.

Generally watermark sequences are inserted a few bits per frame. The data to be carried by the stream is typically mapped into a marking sequence prior to embedding, where the characteristics of the mapping function depend on the type of attack expected. Indeed, since there may be a wide range of attacks, the data may be redundantly mapped in different ways in the hope that at least one mapping will survive all attacks. This leads to the issue of recognizing where a marking sequence begins. One approach is to use synchronizing codes. However the attacker may be able to identify these codes, and if the attacker can eliminate or damage the codes, recovery of mark data may not be possible.

In the system of the present invention, synchronization is tied to frame boundaries. The scale factors included at the beginning of the frame are modified by modifying the LSBs so that they represent a sequence which contains one or more synchronization codes. Specifically, when a frame is selected for synchronization insertion, and a scale factor LSB does not match (e.g. 0 where a 1 is indicated, or a 1 instead of a 0), that scale factor is decremented and all the coefficients in the SFB are adjusted accordingly. Although the synchronization code can be damaged, random flipping of scale factor LSB by an attacker will introduce artifacts. To recover the watermark, a synchronization code is sought and the data is recovered a manner appropriate to the watermarking method.

To evaluate the audio watermarking system of FIG. 5, AT&T's implementation of AAC was used. Watermark synchronization is indicated by the sequence comprising the LSB of the first 44 decoded scale factors in a long block. When the value of the LSB of a scale factor does not match the corresponding bit in the synchronization code then the scale factor is decremented and the spectral coefficients adjusted accordingly, resulting in perceptually irrelevant overcoding of the associated spectral data.

The table of FIG. 6 shows the cost of carrying watermark data inserted by the embodiment of FIG. 5 into every frame of an AAC bitstream for a stereo signal sampled at 44.1 kHz and coded at 96 kbps. Cost is expressed as increase in bits per frame 610 (21.3 ms of audio) and increase in rate 620, and was measured for both synchronization 630 and synchronization+32 bits 640 cases. As can be seen in FIG. 6, the increase in bits per marked frame 610 was 5.2 for synchronization 630 and 9.0 for synchronization+32 640. The increase in rate 620 was 0.25% and 0.44%, respectively.

An important issue for any watermarking algorithm is the quality of the reconstructed signal following an attack which erases the watermark. A naive attack on this marking algorithm has been simulated by zeroing all scale factor LSB.

This attack results in unacceptable distortion in the reconstructed audio signal.

The baseline system for video compression uses a rudimentary perceptual model. A variance-based activity measure is used to select the quantization step-size for each macroblock, as in step 3 of the MPEG-2 TM5 rate control [MPEG video committee, "Test Model 5", ISO-IEC/JC1/SC29/WG11 N0400, Apr. 1993]. I frames are generated every half second; all other frames are P frames. Watermark data was inserted into both I and P frames, and the results were taken from an average over two different 10 second sequences.

The first 44 macroblocks of a frame are used for synchronization. The next several macroblocks (100 or 600 in the Table, out of 1320) of a frame carry mark bits using the embodiment of FIG. 5. For each macroblock, when the LSB of the step-size $Q_p$ does not match, $Q_p$ is decremented. However, a dead-zone is applied to the original $Q_p$ to ensure that zero coefficients remain zero.

A table showing the results of this simulation is shown in FIG. 7. As seen in FIG. 7, the increase in bits per marked frame 710 was 124 for synchronization 730, 138 for synchronization+100 bits 740, and 557 for synchronization+600 bits 750. The corresponding increases in rate 720 were 0.005%, 0.006%, and 0.024%, respectively. Simulation of a naive attack on this algorithm by zeroing all scale factor LSBs demonstrates that this attack results in a perceptible 1.6 dB degradation in PSNR of the reconstructed video signal.

What has been described is merely illustrative of the application of the principles of the present invention. Other arrangements, methods, modifications and substitutions by one of ordinary skill in the art are also considered to be within the scope of the present invention, which is not to be limited except by the claims which follow.

What is claimed is:

1. A perceptual coder for encoding at least one compressed audio or video signal to include hidden data, comprising, in combination:

means for setting quantization step sizes to obtain a set of integer values after quantization of said at least one compressed signal, said means for setting step sizes employing at least one perceptual technique;

means for adding the hidden data to said at least one compressed signal;

means for quantizing said at least one compressed signal; and means for selecting a set of multipliers during the quantization, said adding of the hidden data occurring during the quantization.

2. The coder of claim 1, further including means for selecting a specific Huffman Table for encoding said at least one compressed signal.

3. The coder of claim 2, wherein said selected Huffman Table is not the Huffman Table that would normally be selected for encoding said at least one compressed signal.

4. The coder of claim 1, wherein said hidden data has a watermarking function.

5. The coder of claim 4, wherein said hidden data has the form of at least one watermark data bit.

6. The coder of claim 1, further including:
   means for modifying said encoded compressed signal by utilizing said set of multipliers.

7. The coder of claim 6, wherein each member of said set of multipliers is close to unity.

8. The coder of claim 7, wherein said compressed signal has at least one associated scale factor and said means for modifying comprises, in combination:

means for dividing said at least one scale factor by a respective one of said multipliers; and means for multiplying said integer values by respective ones of said multipliers.

9. The coder of claim 6, wherein said compressed signal has at least one associated scale factor and said means for modifying comprises, in combination:

means for dividing said at least one scale factor by a respective one of said multipliers; and means for multiplying said integer values by respective ones of said multipliers.

10. The coder of claim 1 wherein said means for adding hidden data is responsive to said means for quantizing said at least one compressed signal.

11. A perceptual coder for encoding at least one of compressed audio or video signal to include hidden data, comprising, in combination:

means for setting quantization step sizes to obtain a set of integer values after quantization of said at least one compressed signal, said means for setting step sizes employing at least one perceptual technique;

means for quantizing said at least one compressed signal containing said hidden data;

noiseless coding means for adding the hidden data to said quantized compressed signals; and means for selecting a set of multipliers during the quantization, said adding of the hidden data occurring during the quantization.

12. The coder of claim 11, wherein said hidden data has a watermarking function.

13. The coder of claim 12, wherein said hidden data is added to at least one non-zero one of said integer values.

14. The coder of claim 11, further including:
   means for modifying said encoded compressed signal by utilizing said set of multipliers.

15. The coder of claim 14, wherein said compressed signal has at least one associated scale factor and said means for modifying comprises, in combination:

means for dividing said at least one scale factor by a respective one of said multipliers; and means for multiplying said integer values by respective ones of said multipliers.

16. The coder of claim 14 wherein each member, x, of said set of multipliers is equal to $2^{Ni}$, where N is a positive integer and i represents a set of indices associated with said compressed signal.

17. The coder of claim 16, wherein said compressed signal has at least one associated scale factor and said means for modifying comprises, in combination:

means for dividing said at least one scale factor by a respective one of said multipliers; and means for multiplying said integer values by respective ones of said multipliers.

18. A method of perceptually encoding at least one compressed audio or video signals to include hidden data comprising, in combination, the steps of:

setting quantization step sizes to obtain a set of integer values after quantization of said at least one compressed signal, said setting of step sizes employing at least one perceptual technique;

adding the hidden data to said at least one compressed signal;

quantizing said at least one compressed signal; and selecting a set of multipliers during the quantization, said adding of the hidden data occurring during the quantization.

19. The method of claim 18, further including the step of selecting a specific Huffman Table for encoding said at least one compressed signal.

20. The method of claim 19, wherein said selected Huffman Table is not the Huffman Table that would normally be selected for encoding said at least one compressed signal.

21. The method of claim 18, wherein said hidden data has a watermarking function.

22. The method of claim 21, wherein said hidden data has the form of at least one watermark data bit.

23. The method of claim 18, further including:
modifying said encoded compressed signal by utilizing said set of multipliers.

24. The method of claim 23, wherein each member of said set of multipliers is close to unity.

25. The method of claim 24, wherein said compressed signal has at least one associated scale factor and step of modifying comprises the steps, in combination, of:
dividing said at least one scale factor by a respective one of said multipliers; and
multiplying said integer values by respective ones of said multipliers.

26. The method of claim 23, wherein said compressed signal has at least one associated scale factor and said step of modifying comprises the steps, in combination, of:
dividing said at least one scale factor by a respective one of said multipliers; and
multiplying said integer values by respective ones of said multipliers.

27. The method of claim 18, further including the step of marking said at least one audio or video signal with hidden data before compression.

28. The method of claim 18, further including the step of bitstream marking said quantized compressed signal with hidden data.

29. The method of claim 28, further including the step of marking said at least one audio or video signal with hidden data before compression.

30. The method of claim 18 wherein said step of adding hidden data occurs simultaneously with said step of quantizing said at least one compressed signal.

31. The method of claim 18 wherein said step of adding hidden data occurs after said step of quantizing said at least one compressed signal.

32. A method of perceptually encoding at least one compressed audio or video signal to include hidden data comprising, in combination, the steps of:
setting quantization step sizes to obtain a set of integer values after quantization of said at least one compressed signal, said setting of step sizes employing at least one perceptual technique;
quantizing said at least one compressed signal containing said hidden data;
adding the hidden data to said quantized compressed signal; and
selecting a set of multipliers during the quantization, said adding of the hidden data occurring during quantization.

33. The method of claim 32, wherein said hidden data has a watermarking function.

34. The method of claim 33, wherein said hidden data is added to at least one non-zero one of said integer values.

35. The method of claim 32, further including:
modifying said encoded compressed signal by utilizing said set of multipliers.

36. The coder of claim 35, wherein said compressed signal has at least one associated scale factor and said step of modifying comprises, in combination:
dividing said at least one scale factor by a respective one of said multipliers; and
multiplying said integer values by respective ones of said multipliers.

37. The method of claim 35, wherein each member, x, of said set of multipliers is equal to $2^{Ni}$, where N is a positive integer and i represents a set of indices associated with said compressed signal.

38. The method of claim 37, wherein said compressed signal has at least one associated scale factor and said step of modifying comprises, in combination:
dividing said at least one scale factor by a respective one of said multipliers; and
multiplying said integer values by respective ones of said multipliers.

39. The method of claim 32, further including the step of marking said at least one audio or video signal with hidden data before compression.

40. The method of claim 32, further including the step of bitstream marking said quantized compressed signal with hidden data.

41. The method of claim 40, further including the step of marking said at least one audio or video signal with hidden data before compression.

42. A method of perceptually coding as signal to add watermark data using a codebook characterized by the steps of:
establishing scale factors from perceptual thresholds;
establishing scale factor bands to watermark;
choosing a set of multipliers approximately equal to 1; and
dividing the scale factors by respective multipliers of said set of multipliers for selecting said codebook.

* * * * *

UNITED STATES PATENT AND TRADEMARK OFFICE
CERTIFICATE OF CORRECTION

PATENT NO. : 6,493,457 B1 Page 1 of 1
DATED : December 10, 2002
INVENTOR(S) : Schuyler Reynier Quackenbush et al.

It is certified that error appears in the above-identified patent and that said Letters Patent is hereby corrected as shown below:

Title page,
Item [57], ABSTRACT,
Line 18, "$x,_i$" has been replaced with -- $x_i$, --,
Line 22, "Huffinan table" has been replaced with -- Huffman table --.

Column 12,
Line 43, "coding as signal" has been replaced with -- coding a signal --.

Signed and Sealed this

Twenty-ninth Day of July, 2003

JAMES E. ROGAN
*Director of the United States Patent and Trademark Office*